United States Patent
Horn et al.

[15] 3,693,744
[45] Sept. 26, 1972

[54] MULTI-PURPOSE VEHICLE

[72] Inventors: Josef Horn, Rimschweiler; Kurt Neumeier; Franz Scharfenberger, both of Zweibrucken, all of Germany

[73] Assignee: Karl Peschke Kapilalverwallungsgesellschaft Karl Peschke mbH, Zweibruckan/Pfalz, Germany

[22] Filed: March 13, 1970

[21] Appl. No.: 19,425

[30] Foreign Application Priority Data

March 13, 1969 Germany..........P 19 12 641.1

[52] U.S. Cl...................180/53 R, 180/54, 180/77 S
[51] Int. Cl.........................B60n 1/02, B60k 17/28
[58] Field of Search..................................180/77 S

[56] References Cited

UNITED STATES PATENTS

| | | | |
|---|---|---|---|
| 1,681,319 | 8/1928 | Bartlett | 180/77 S UX |
| 2,384,890 | 9/1945 | Coldwell | 180/77 S UX |
| 3,198,276 | 8/1965 | Gordon | 180/77 S X |
| 3,223,193 | 12/1965 | Reynolds et al. | 180/77 S |

FOREIGN PATENTS OR APPLICATIONS

| | | | |
|---|---|---|---|
| 1,432,987 | 2/1966 | France | 180/77 S |
| 10,290 | 9/1909 | Great Britain | 180/77 S |

*Primary Examiner*—A. Harry Levy
*Attorney*—Robert H. Jacob

[57] ABSTRACT

Multi-purpose vehicle having a steering axle with small wheels and a rigid drive axle with large wheels for supporting and operating tools to be mounted on the vehicle and a vehicle propulsion means for moving in two directions of travel, in street driving direction and work driving direction, which has a driver seat disposed generally centrally pivotable through a 180° angle, one each steering wheel and foot pedal levers for gas, clutch and brake in each direction of travel, and the other operating and control levers for operating the vehicle and the tools carried thereby disposed laterally of the driver's seat.

2 Claims, 4 Drawing Figures

INVENTORS:
Josef HORN
Kurt NEUMEIER
Franz SCHARFENBERGER
BY
Robert K. Jacob

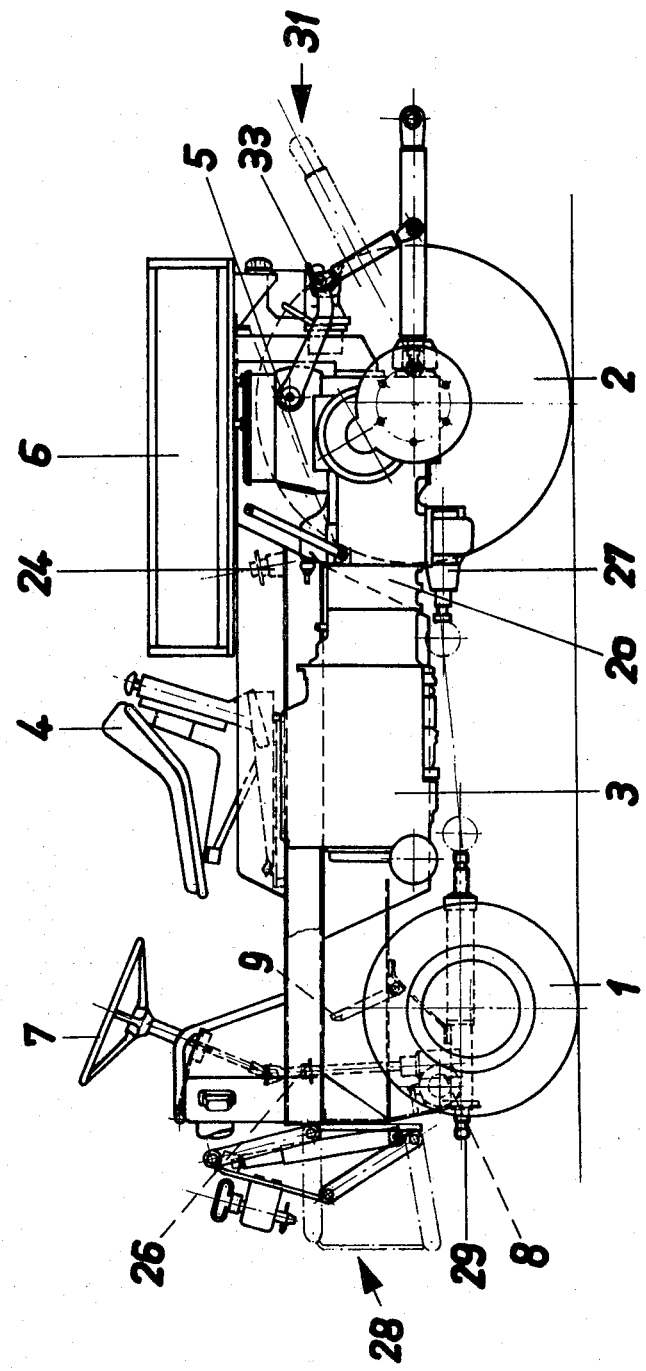

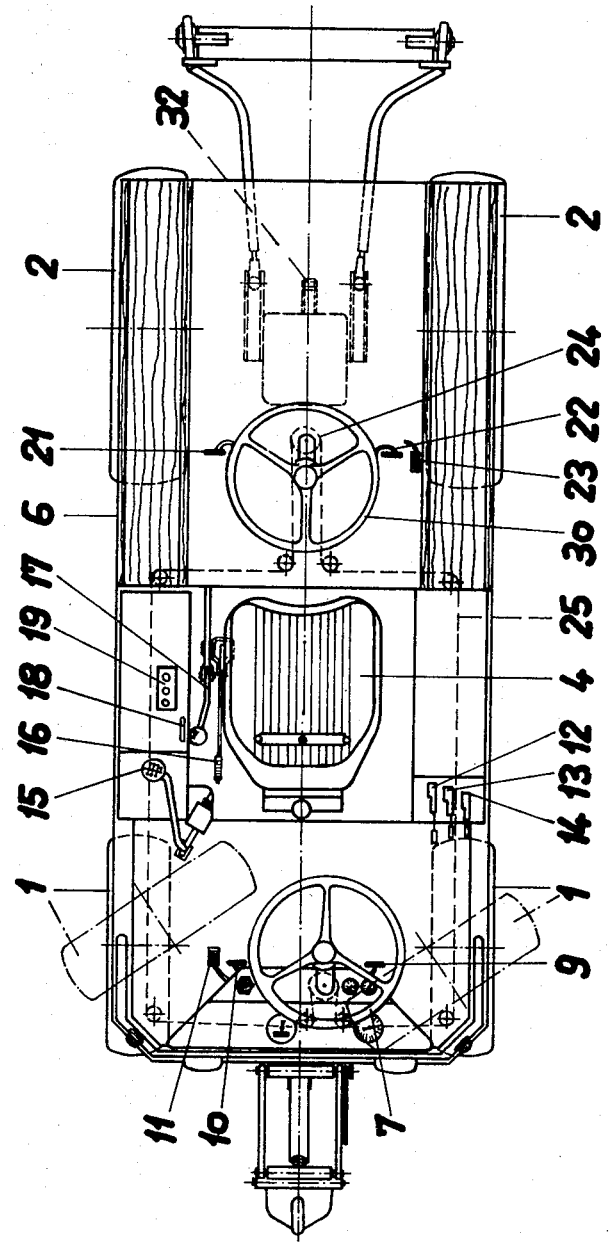

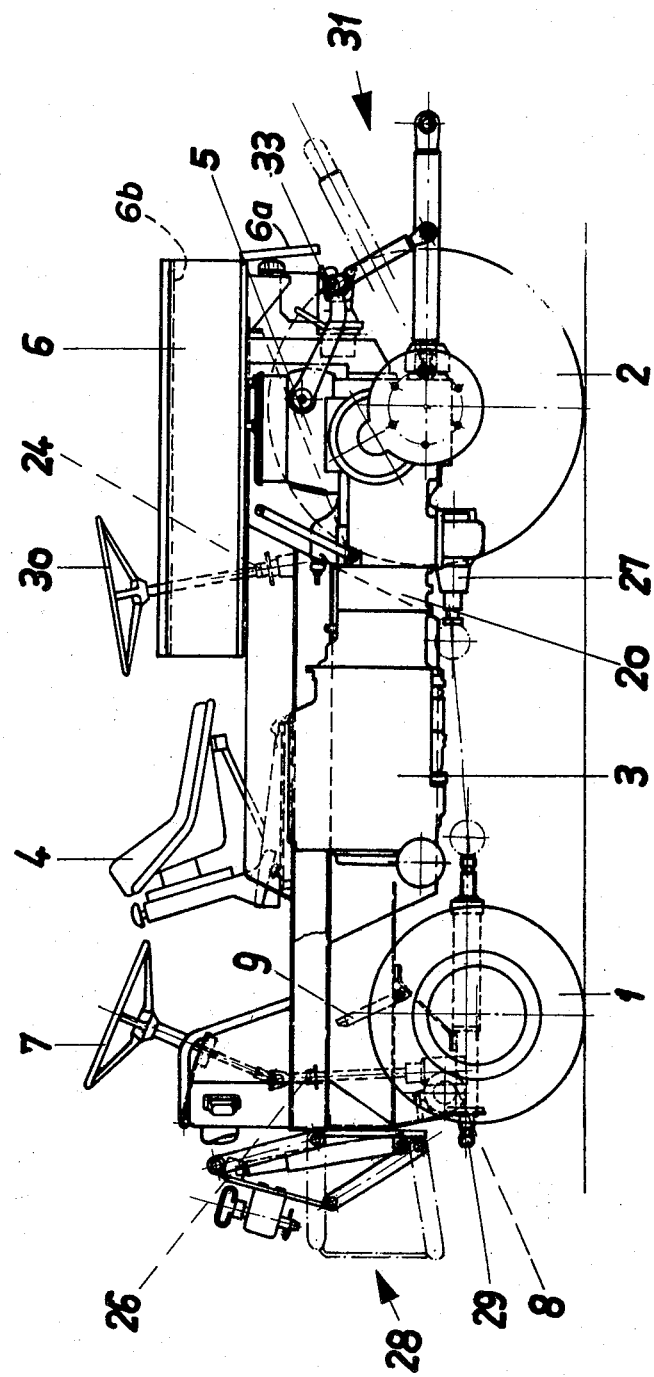

MULTI-PURPOSE VEHICLE

BACKGROUND OF THE INVENTION

The invention is concerned with a vehicle for performing working operations. More in particular, the invention concerns a multi-purpose vehicle which is intended for use primarily in municipalities where it is deployed as a tool carrier and a tool operating or driving unit. This vehicle is similar to known agricultural tractors which are intended to carry and drive ground working tools and the like.

A few applications of the vehicle are in the field of lawn mowers or snow plowing vehicles, and in addition the vehicle can also be equipped with different other tools as in connection with the aforementioned agricultural tractors.

One of the objects of the vehicle is described in connection with deployment of the vehicle as a lawn mower. The vehicle and its tools are generally located in a communal park or a shop whence the deployment is directed. If the vehicle is transported from this central location to a particular place of deployment, it has to travel in the general street traffic so that it must meet the requisites as to manner of construction and fittings or equipment. In the location of deployment the vehicle must meet as completely as possible its requisites as a tool carrier and tool driving machine, for example, carrier and driving means for a lawn mower as pointed out above. In addition, it must be able to transport a number of the necessary tools and, for example, also fertilizer, sand or salt to be carried to the location of operations.

SUMMARY OF THE INVENTION

In accordance with the invention, the object is met by means of a vehicle that has a steering axle with small wheels and a rigid driving axle with large wheels, and driving means adapted for operation in two directions of travel, and it has a driver's seat that is pivotable through an angle of 180°, and one each steering wheel and foot pedal lever for gas, clutch and brake for each direction, while the remaining operating and control levers for the operation of the vehicle and the tools carried and driven by it are sole elements that are provided laterally of the driver's seat.

The steering wheel provided for travel in one direction in the street is fixedly installed, while the steering wheel required for travel in the direction of work performance is removable and the necessary foot pedals for travel in the working direction are covered during street travel by a loading bridge or platform.

Furthermore, the vehicle is preferably equipped with an under-floor or cab-over drive motor below the driver's seat. In addition, it has the conventional three-point suspension, a power take off shaft and coupling means known per se for connecting and driving the tools.

Vehicles are known for driving in two directions where the driver's seat can be pivotally moved around a vertical steering axle through an angle of 180°. This arrangement, however, is encumbered in that the sight or viewing conditions are only favorable and sufficient in one direction of travel, while with the necessary displacement of the seat for operation in the other direction of travel the sighting conditions are unfavorable. Furthermore, it has also been proposed heretofore to provide two steering wheels, one for each direction of travel that are connected by way of a differential gear. That vehicle, however, is not only provided with two steering wheels, but a complete duplicate set of operating and steering levers is necessary. Beyond that, this vehicle is not equipped as a tool carrying vehicle and, therefore, it is not suitable for the purposes for which the invention is intended. Also known dual controls such as are used in driving school vehicles do not suggest any solution for the problems met in accordance with the invention.

As compared to these vehicles of the prior art, the vehicle in accordance with the invention offers the advantage of normal vehicles for street travel having a front steering axle and the conventional steering and operating devices. On the other hand, for travel in the direction of working operations, the rigid axle with the large wheels is in front, the steering axle is located at the rear. The use of the tools carried and driven by the vehicle can, therefore, be more accurate.

Due to the fact that the seat is essentially in the center of the vehicle, the sight or view conditions are just as good for travel in the working direction as they are for street traffic. If need be, the rear wall of the loading bridge can be so arranged as to be tilted downward in order to improve the viewing conditions.

Due to the fact that when the vehicle is used in street traffic the dual operating levers are covered by the loading bridge, so that erroneous operation, or unintentional blocking thereof cannot occur. Only when the vehicle is prepared for travel in the working direction the additional operating levers are exposed by turning up the bottom of the loading bridge. Preferably, the bottom of the loading bridge may be folded to the side in accordion fashion.

The loading bridge is only necessary when travelling in the direction of street travel because only then apparatus and tools or the like have to be transported. At the location of deployment the load is discharged and, accordingly, the loading bridge is free.

BRIEF DESCRIPTION OF THE DRAWINGS

Further features and details of the invention and the advantages obtained thereby will become apparent from the following description of an embodiment schematically illustrated in the accompanying drawings in which:

FIG. 2 is a side view of the vehicle,

FIG. 3 shows the vehicle in working condition from the top, and

FIG. 4 is a side view of the vehicle as shown in FIG. 3.

DESCRIPTION OF THE INVENTION

Figure 1:
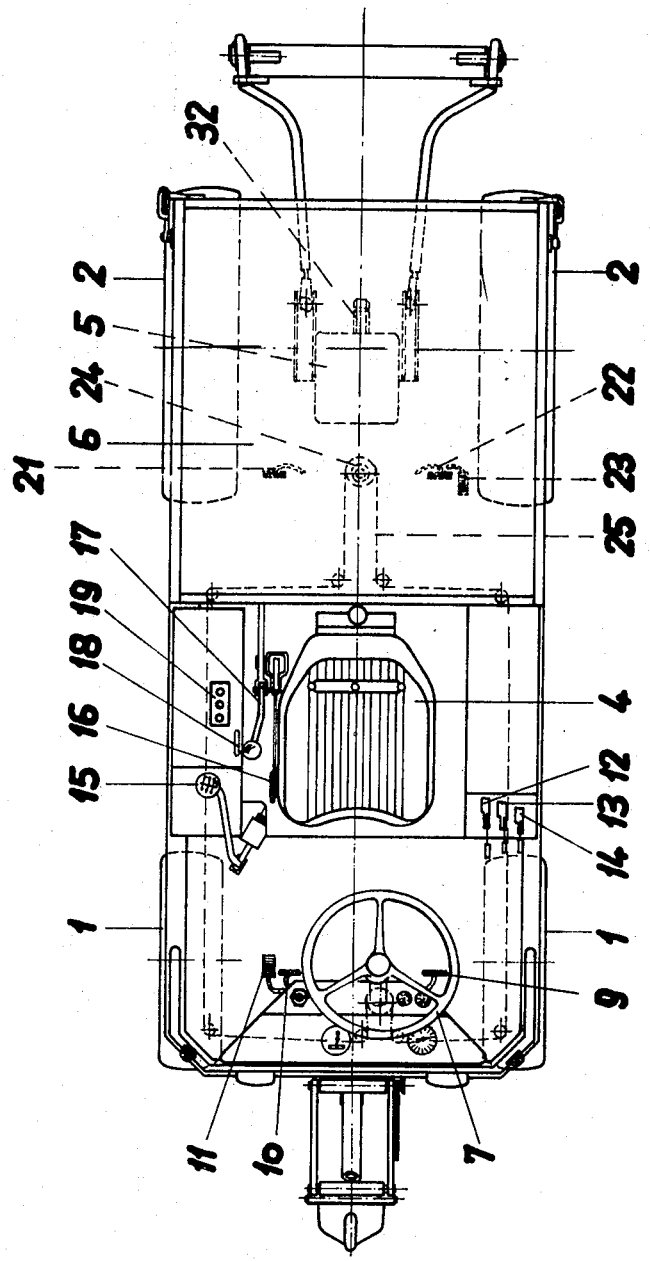
FIG. 1 shows the vehicle in street travelling condition from the top.

The vehicle is equipped with a front steering axle having small wheels 1 that is forward for street travel and a rigid driving axle having large wheels 2 which is forward during travel for working operations. If need be, the wheels 1 may also be driven.

The vehicle is furthermore equipped with an underfloor or over-cab engine 3 below a driver's seat 4. Both are approximately in the center of the vehicle as related to its length.

The driver's seat 4 may be turned about a vertical axis through a 180° angle so that it can be utilized for both directions of travel. Inasmuch as the seat is located generally centrally of the vehicle the operator has equally satisfactory viewing conditions in both directions.

A gear and hydraulic block 5 is connected to the under-floor motor 3 which in a known manner includes the necessary driving and attaching means for driving the vehicle proper and the tools to be mounted thereon.

A loading bridge 6 is disposed over the gear and hydraulic block 5. As mentioned above and as shown in FIG. 4, the bottom 6b of the loading bridge 6 can be folded to the sides, while the gate 6a can be turned down.

For moving in the direction of street travel, the vehicle is equipped in a conventional manner. For this purpose it has a steering wheel 7 which by way of a steering mechanism 8 acts on the steering axle having the small running wheels 1. In a similar conventional manner, the foot pedal for the clutch 9, a foot brake lever 10 and an accelerator lever 11 are provided.

Laterally of the driver's seat 4 to be reached conveniently from the driver's seat while travelling in either one of the two directions, power take off control levers 12 and 13 are arranged, and also a lever 14 for operating the differential pawl or latch, a gear selecting lever 15, a hand brake lever 16, a shifting lever 17 for a reversible gear, a hand gas lever 18 and a hydraulic block valve 19.

For the operation of the vehicle in work performing direction where the large wheels 2 are at the front end on their rigid axle, a second clutch foot pedal 21, a second foot brake pedal 22, a second accelerator lever 23 and a second steering block 24 are provided, upon which a second steering wheel 30 can be mounted. The connection between the two steering mechanisms with the steering wheels 7 and 30 is by means of a chain 25 which when operated by the steering wheel 30 drives a chain wheel 26 upon the steering rod of the steering wheel 7.

The tools provided such as a mowing mechanism are preferably secured at the three-point suspension 31 and are driven by way of the power take off 32, but they may also be installed at the bottom of the vehicle as equipments intermediate the axles and driven by a bottom power take off 27. Furthermore, a hydraulically operated bar linkage 28 (square) for receiving tool connections may be provided for driving the tools from a front power take off.

In those cases the work travel direction may be the same as the street driving direction. The take off shaft direction of rotation is changed by way of the reversing gear to suit the respective direction of travel.

Likewise, the operating lever 17 of the reversing gear 20 is suitably shifted for the desired direction of travel.

Furthermore, the vehicle is equipped with six forward speed gears and one reverse travel gear which can be adapted by way of the reverse gear for both directions of travel. As already mentioned, the take off shafts rotate in accordance with the established system in the corresponding direction of travel.

The steering in work travel direction by way of the steering wheel 30 takes place through the chain connection with chain 25 in the same sense as steering in street travel direction by way of the fixedly mounted steering gear 7. When the vehicle is deployed in work travel direction, the steering wheel 7 need not be removed because the vehicle is not moving in street traffic.

Due to the cab-over drive motor, the additional and useful loading bridge may be provided, even though the vehicle does not exceed the conventional length of corresponding agricultural tractors. In addition to the good visibility in both directions of travel already mentioned, the chosen arrangement of the operating levers affords all necessary comfort and safety for operation in both directions of travel, together with very economical dual equipment. Among the most important features, however, is that owing to proper adaptation to the work travel direction the tools and equipments operated by the vehicle can be utilized under the most favorable kinematic conditions.

Having now described our invention with reference to the embodiment illustrated, what we desire to protect by letters patent is set forth in the appended claims.

What is claimed is:

1. A multi-purpose vehicle adapted for towing including means for driving in two directions of travel, one the direction of street traffic and the other the direction of performing working operations, said vehicle comprising a steering axle having small wheels and a rigid drive axle having large wheels including tools, mounted on said drive axle, a steering wheel with a steering rod for each direction of travel, means including two steering blocks one associated with each said steering wheel and rod linking said steering wheels and rods to each other and to said steering axle, foot pedals for gas, clutch and brake disposed proximate each steering rod, a driver's seat pivotally mounted generally centrally of the vehicle as related to its length and disposed between said steering wheels and movable about a vertical axis through an angle of 180°, an underfloor engine below said driver's seat, operating and control devices disposed laterally of said driver's seat and means including a power take-off and a suspension device linking said operating and control devices to said tools for the operation thereof while travelling in said working direction, said steering wheel and column for travelling in the direction of street traffic being fixedly mounted for both directions of travel, and said steering wheel and rod for the direction of performing working operations being removable, and means for covering said foot pedals associated with the steering wheel for travelling in the working direction comprising a foldable loading bridge disposed above the area of said driving wheel axle.

2. A multi-purpose vehicle in accordance with claim 1, wherein said loading bridge serves simultaneously as a cover for the pedals coordinated with said removable steering wheel.

* * * * *

UNITED STATES PATENT OFFICE
CERTIFICATE OF CORRECTION

Patent No. 3,693,744　　　　Dated September 26, 1972

Inventor(s) Josef Horn, Kurt Neumeier, Franz Scharfenberger

It is certified that error appears in the above-identified patent and that said Letters Patent are hereby corrected as shown below:

In the heading, under "Assignee", correct

Karl Peschke Kapilalverwallungsgesellschaft
    Karl Peschke mbH, Zweibruckan/Pfalz, Germany to read:

Karl Peschke, Kapitalverwaltungsgesellschaft
    Karl Peschke mbH, Zweibrucken/Pfalz, Germany Signed and sealed this 17th day of April 1973.

(SEAL)
Attest:

EDWARD M. FLETCHER, JR.　　　　ROBERT GOTTSCHALK
Attesting Officer　　　　　　　　Commissioner of Patents